United States Patent [19]
Rosen

[11] Patent Number: 5,800,855
[45] Date of Patent: Sep. 1, 1998

[54] CHEESECAKE ICE CREAM

[76] Inventor: Michael A. Rosen, 73 Melanie La., Syosset, N.Y. 11791

[21] Appl. No.: 659,964

[22] Filed: Jun. 7, 1996

Related U.S. Application Data

[63] Continuation of Ser. No. 423,407, Apr. 18, 1995, abandoned.
[51] Int. Cl.$^6$ .............................. A23C 19/00; A23G 9/00
[52] U.S. Cl. .................... 426/565; 426/566; 426/567; 426/582; 426/583; 426/586; 426/101
[58] Field of Search ........................... 426/573, 583, 426/565, 566, 567, 582, 101, 586, 570

[56] References Cited

U.S. PATENT DOCUMENTS

| | | | |
|---|---|---|---|
| 4,012,533 | 3/1977 | Jonas | 426/565 |
| 4,732,772 | 3/1988 | Nolte | 426/573 |
| 4,795,650 | 1/1989 | Goobert | 426/306 |
| 5,445,844 | 8/1995 | Woolf et al. | 426/580 |

Primary Examiner—Cynthia L. Nessler
Attorney, Agent, or Firm—Clifford L. Tager

[57] ABSTRACT

The present invention is directed to a frozen cheesecake ice cream which preferably comprises cream, milk, condensed skim milk, cream cheese, cane sugar and a unique stabilizing system having a base component and a stabilizer component. The cream, milk and condensed skim milk are pasteurized, then cooled to a temperature suitable for culturing. A culture media is added to culture the pasteurized mixture for preferably ten to fourteen hours. Thereafter, the cream cheese, cane sugar and stabilizing system are added. The stabilizing system comprises a base component and a stabilizer component. The base component is preferably sodium bicarbonate, commonly referred to as baking soda. A by-product of the culturing process is lactic acid. If the culturing process were to continue unabated, the acidity would eventually cause the mixture to coagulate. The addition of the base component and the cane sugar arrests the culturing process. Specifically, the sodium bicarbonate (a base) neutralizes a portion of the lactic acid thus reducing the level of acidity, thereby stabilizing the milk proteins so that they remain in suspension, preventing the mixture from coagulating. The cane sugar stops additional bacteria from growing. It has been found that reducing the amount of lactic acid also improves the overall flavor of the cheesecake ice cream product and greatly enhances the sweetening effect of the cane sugar.

17 Claims, 2 Drawing Sheets

CHEESECAKE ICE CREAM

The application is a continuation of application Ser. No. 08/423,407, filed Apr. 18, 1995, now abandoned.

BACKGROUND OF THE INVENTION

1. Technical Field

The present invention is directed to a frozen comestible. More particularly, the present invention is directed to a frozen cheesecake ice cream.

2. Background Information

Marketing studies have indicated that cheesecake is one of the most popular after-dinner desserts served by restaurants in the United States. Additionally, marketing studies have indicated that ice cream is one of the most popular after-dinner desserts and snacks served in the home.

Accordingly, it is desirous, from a marketing perspective, to be able to combine both popular desserts in the form of a cheesecake ice cream which is smooth, rich and creamy and tastes great. Additionally, it is desirous, from a manufacturing perspective, to be able to produce a cheesecake ice cream with conventional equipment typically found in frozen dessert manufacturing facilities.

SUMMARY OF THE INVENTION

The present invention is directed to a frozen cheesecake ice cream and a method of manufacturing same. In the preferred embodiment, the cheesecake ice cream comprises cream, milk, condensed skim milk, cream cheese, cane sugar and a unique stabilizing system having a base component and a stabilizer component.

In the preferred embodiment, the fluid dairy ingredients, i.e., the cream, milk and condensed skim milk, are pasteurized and then cooled to a temperature suitable for culturing.

After the fluid dairy ingredients have been suitably cooled, a culture media, preferably specified for the production of either sour cream or cream cheese, is added to culture the pasteurized mixture, preferably under agitation, for approximately ten to fourteen hours.

Thereafter, the cream cheese, cane sugar and unique stabilizing system are preferably added to the cultured mixture. The base component of the stabilizing system is preferably sodium bicarbonate, commonly referred to as baking soda.

From a food chemistry perspective, culturing the fluid dairy ingredients of cream, milk and condensed skim milk, via the addition of the culturing media, causes the mixture to form a liquid cream cheese-like product. A by-product of the culturing process is lactic acid. If the culturing process were to continue unabated, the acidity would eventually cause the milk proteins to coagulate, thereby forming a more solid cream cheese-like product.

However, the addition of the base component and the cane sugar arrests the culturing process. Specifically, the sodium bicarbonate (a base) neutralizes a portion of the lactic acid thus reducing the level of acidity, thereby stabilizing the milk proteins so that they remain in suspension, preventing the mixture from coagulating. The addition of the cane sugar stops further bacteria from growing.

It has been found that reducing the amount of lactic acid also improves the overall flavor of the cheesecake ice cream product and greatly enhances the sweetening effect of the cane sugar.

The stabilizer component stabilizes the mixture, i.e., binds the free water in the mixture, which greatly reduces the formation of ice crystals in any final ice cream product, thereby increasing the ice cream's overall quality.

The mixture is then preferably pasteurized and a cheesecake ice cream product can be manufactured therefrom via conventional processing according to good manufacturing practices accepted by the dairy and frozen dessert industry.

DESCRIPTION OF THE PREFERRED EMBODIMENT(S)

Figure 1:
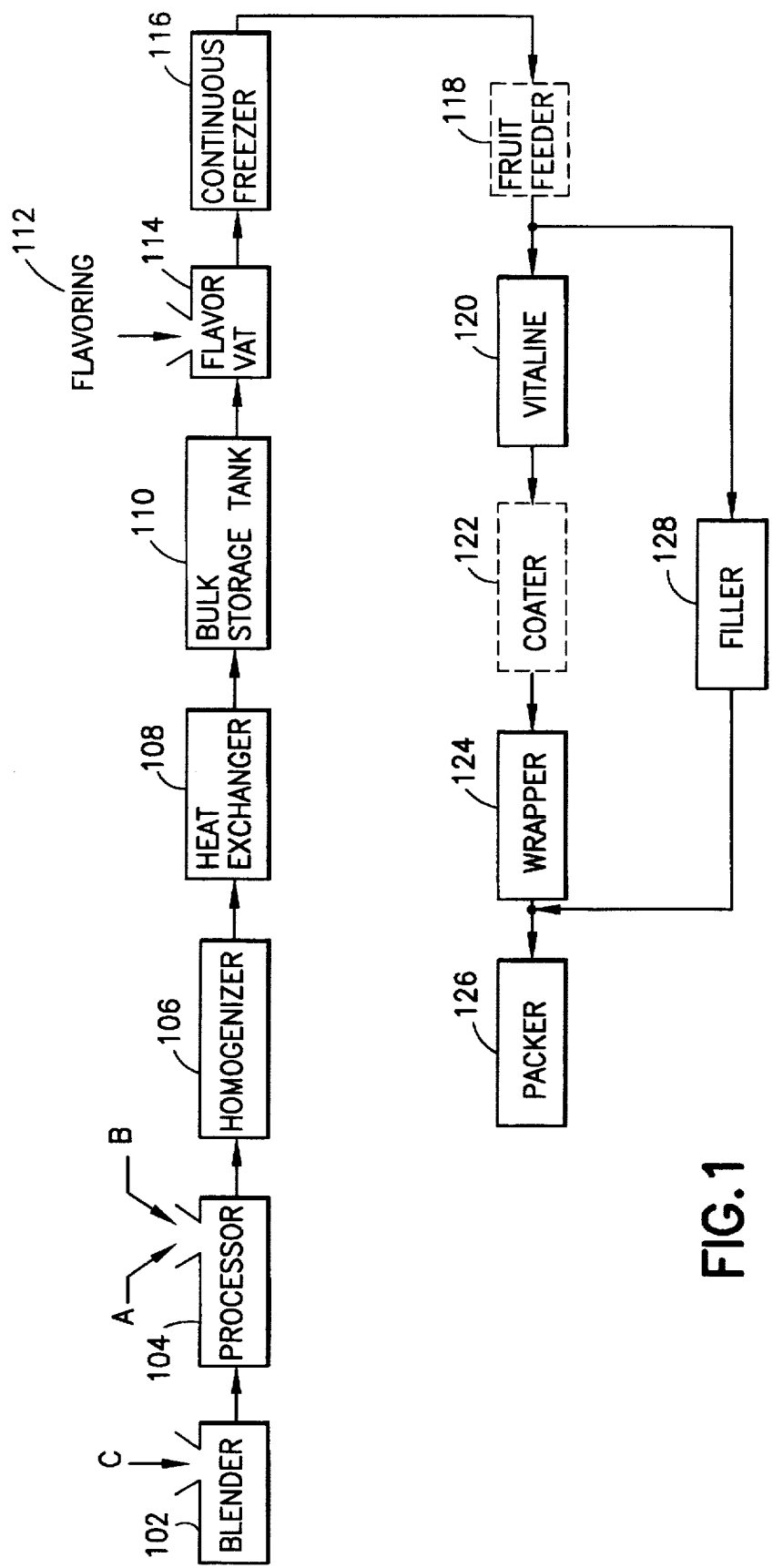
FIG. 1 is a flow diagram illustrating a first preferred process for producing the cheesecake ice cream of the present invention in the shape of individual ice cream bars on a stick, sandwiches and/or in bulk for packaging in containers.

Turning now to FIG. 1, a flow diagram illustrating a first preferred process for producing the cheesecake ice cream of the present invention in the shape of individual ice cream bars on a stick and/or in bulk for packaging in containers is illustrated.

In the preferred embodiment, the cheesecake ice cream of the present invention comprises cream, milk, condensed skim milk, cream cheese, cane sugar and a unique stabilizing system having a base component and a stabilizer component.

In the preferred embodiment, fluid dairy ingredients A, comprising cream, milk and condensed skim milk, are placed in processor 104 where they are preferably agitated and heated to 185° F. for about 30 minutes to pasteurize the ingredients. Thereafter, the ingredients are preferably cooled to a temperature suitable for culturing, e.g., 85° to 100° F.

The cream preferably comprises a relatively high butterfat content, e.g., about 40% butterfat. In the preferred embodiment, the amount of cream is about 24.5% by weight.

The milk is preferably whole milk, although milk having a butterfat content of 2% or 1% may be substituted therefor. In the preferred embodiment, the amount of milk is about 19.4% by weight.

The condensed skim milk preferably has a total solids level between 30%–40%. The amount of condensed skim milk is preferably about 10.3% by weight.

After the fluid dairy ingredients have been suitably cooled, frozen culture media B, preferably specified for the production of either sour cream or cream cheese, is added to processor 104. Dairy ingredients A are allowed to culture, preferably under agitation, for approximately ten to fourteen hours, in order to achieve a desired flavor characteristic.

In the preferred embodiment, the frozen culture media is DVS-DSG #2000-60 supplied by Chris Hansen's Laboratory, Inc.

Thereafter, the remaining ingredients C, comprising cream cheese, cane sugar and the stabilizing system, are preferably blended in blender 102, e.g., a Lanco or Norman blender, until fully liquefied. Thereafter, ingredients C are added to the cultured mixture in processor 104, and the combined ingredients therein are preferably blended for at least 15 minutes.

The cream cheese is preferably a relatively high quality cream cheese, comprising cultured pasteurized milk and cream, salt and stabilizers such as xanthan and/or carob bean and/or guar gum. In the preferred embodiment, the cream cheese is about 13% by weight. Alternatively, a low-fat or no-fat cream cheese can be substituted therefor, either in whole or in part, to produce a lower fat or "light" version of the cheesecake ice cream.

Cane sugar is the preferred sweetening agent, either in dry or liquid form. The amount of cane sugar is preferably about 21.5% (dry form) or 32.2% (liquid form). As is known in the art, liquid sugar comprises 67.5% cane sugar (dry form) and 32.5% water. Where a liquid sugar is used, the amount of milk employed is preferably adjusted accordingly.

Optionally, an artificial sweetener may be used. Where an artificial sweetener is used, the amount thereof is preferably dependent upon its equivalent degree of sweetness, relative to that of cane sugar.

The stabilizing system preferably comprises a base component and a stabilizer component. The base component is preferably sodium bicarbonate, commonly referred to as baking soda.

The stabilizer component preferably comprises the following constituents, listed in descending order of predominance: carob bean gum; mono- and diglycerides; guar gum; salt; and carrageenan.

In the preferred embodiment, the stabilizing system is Mike's Original Cheesecake Ice Cream Stabilizer No 2, available through Controlled Food Systems, Pittsburgh, Pa.

At this point, the mixture can be manufactured into a cheesecake ice cream product via conventional processing according to good manufacturing practices accepted by the dairy and frozen dessert industry.

From a food chemistry perspective, culturing the fluid dairy ingredients of cream, milk and condensed skim milk, via the addition of the culturing media, causes the mixture to form a liquid cream cheese-like product, and thereby develop its smooth, creamy texture and flavor.

A by-product of the culturing process is lactic acid. If the culturing process were to continue unabated, the acidity would eventually cause the milk proteins to coagulate, thereby forming a more solid cream cheese product.

However, the addition of the base component and the cane sugar arrests the culturing process. Specifically, the sodium bicarbonate (a base) neutralizes a portion of the lactic acid thus reducing the level of acidity, thereby stabilizing the milk proteins so that they remain in suspension, preventing the mixture from coagulating. The cane sugar stops additional bacteria from growing.

By adding the base component to the mixture, the level of lactic acid is reduced and standardized to a desired level. It has been found that reducing the amount of lactic acid also improves the overall flavor of the cheesecake ice cream product and greatly enhances the sweetening effect of the cane sugar.

The stabilizer component stabilizes the mixture. Specifically, the carob bean gum, guar gum and carrageenan bind the free water in the mixture. Binding the free water in the mixture greatly reduces the formation of ice crystals in the final ice cream product, thereby increasing the ice cream's overall quality.

The binding of the free water causes the mixture to become more viscous. If the viscosity is too high, however, the mixture may have problems flowing through a standard heat exchanger 108 typically found in the conventional ice cream manufacturing process described below.

Accordingly, carob bean gum is preferably the predominant binder, relative to guar gum and carrageenan, since, unlike other gums, carob bean gum slowly becomes active only after its temperature has been elevated, e.g., by pasteurization of the mixture (as described below). Thus, the mixture remains less viscous for a relatively longer period of time and is more able to flow through standard heat exchanger 108.

The stabilizer component preferably also comprises mono- and diglycerides. The stabilizer component preferably further comprises salt, since salt reduces the surface tension of the mixture.

To manufacture a cheesecake ice cream product from the mixture via conventional processing, the mixture in processor 104 is preferably reheated to a temperature of 165° F. and held for 30 minutes to pasteurize all of the cheesecake ice cream ingredients therein.

The pasteurized mixture is pumped into homogenizer 106 where it is homogenized. Homogenizer 106 is preferably a two-stage homogenizer having a second stage pressure of about 500 pounds per square inch (psi) and a first stage pressure of about 2000 psi.

The homogenized mixture preferably proceeds to heat exchanger 108, wherein the temperature of the mixture is preferably reduced to about 45° F., before being pumped into refrigerated bulk storage tank 110 where the mixture is preferably further cooled to about 40° F.

Figure 2:
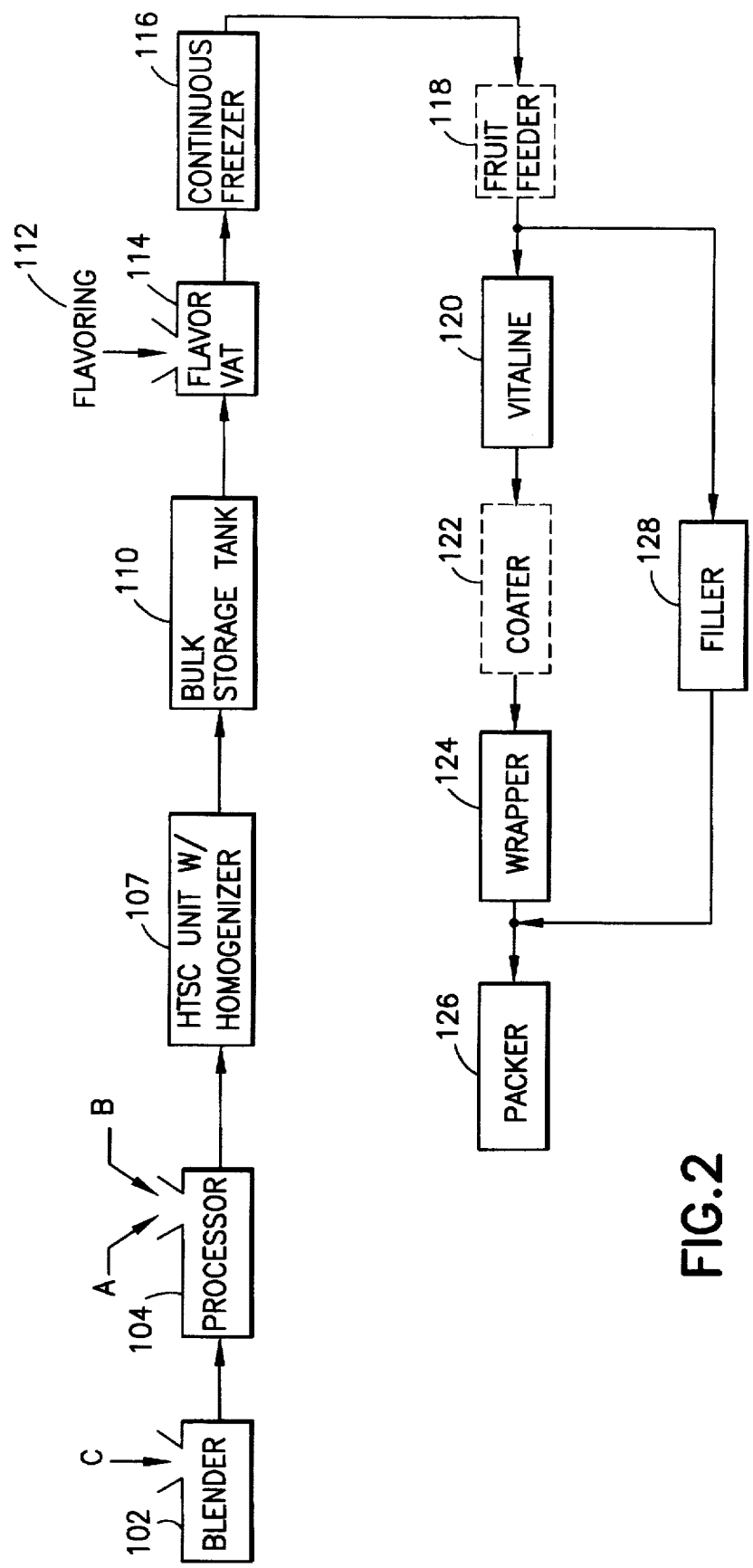
FIG. 2 is a flow diagram illustrating a second preferred process for producing the cheesecake ice cream of the present invention in the shape of individual ice cream bars on a stick, sandwiches and/or in bulk for packaging in containers.

Alternatively, with reference to FIG. 2, the mixture from processor 104 can be pumped into high-temperature, short-time pasteurizer 107, wherein the cheesecake ice cream mixture will be flash-pasteurized in a very short time interval (about 30 seconds at 180° F.), homogenized and cooled simultaneously therein before being pumped into refrigerated bulk storage tank 110.

Returning to FIG. 1, the mixture is preferably stored in refrigerated bulk storage tank 110 for at least eight hours to stabilize and balance the temperature of the mixture. Storing the mixture for at least this length of time also ages the mixture, thereby yielding increased taste thereto.

Flavoring 112 is preferably admixed into the mixture via flavor vat 114. In the preferred embodiment, flavoring 112 is a natural flavoring agent or agents included to impart a cheesecake flavor, such as pure vanilla extract. The amount of vanilla extract is preferably relatively nominal, preferably under about 3% by weight, and more preferably about 0.1% by weight. Alternatively, other natural flavors such as lemon juice, lemon rind, orange juice and/or orange rind may be added, either in lieu of or in addition to, the vanilla extract.

The mixture preferably proceeds to continuous freezer 116 where it is preferably further cooled to about 24° F. Continuous freezer 116 preferably also aerates the mixture, i.e., injects the mixture with air to increase its volume, commonly referred to as an overrun. The amount of overrun is preferably from about 50% to about 70% by volume, and more preferably about 60% by volume. Freezer 116 is preferably a continuous ammonia ice cream freezer.

The mixture emerging from the continuous freezer is commonly referred to as ice cream. Given the preferred ingredients, the ice cream of the present invention is a cheesecake ice cream made from 100% natural ingredients.

The cheesecake ice cream of the present invention may optionally be further flavored, either in lieu of or in addition to flavoring 112, via fruit feeder 118. Other natural flavoring can include but is not limited to: fruit flavor, fruit pieces, fruit extracts, fruit juices or fruit preserves; chocolate flavor, cocoa, chocolate pieces or chocolate syrup; almond flavor or almond extract; ground spices; coffee; nut meats, marshmallow, candy confections; and/or crunches.

Cheesecake ice cream novelties of the present invention can be produced in any shape, e.g., wedges that resemble a slice of cheesecake, bite-size nuggets or ice cream sandwiches. The cheesecake ice cream can be also be produced in the shape of ice cream bars, e.g., via a conventional vitaline.

In vitaline 120, the cheesecake ice cream of the present invention is injected into appropriately-shaped molds, with sticks being inserted therein at about the midway point in the production line.

An evacuator portion (not shown) of the vitaline can optionally be employed to produce cheesecake ice cream bars having a sherbet or frozen ice coating thereon. The evacuator portion first fills the molds with the sherbet or frozen ice, allowing it to freeze along the surface of the molds. A rod is then inserted into each mold to evacuate the center portion thereof before the sherbet or frozen ice located in the center has hardened. The cheesecake ice cream is then injected into the center of each mold, as described above.

The exterior surface of the cheesecake ice cream bars can optionally be coated by coater 122. Coatings can include but are not limited to a layer of chocolate, chocolate crunch, graham cracker crunch and/or toasted almond crunch. The coated bars are thereafter preferably individually wrapped by wrapper 124 and packed into boxes by packer 126.

In addition to the novelties, the cheesecake ice cream of the present invention may be produced in bulk and packaged in any suitable type or size container, e.g., cups, pints, quarts or half-gallons, for individual or multiple portion enjoyment. The cheesecake ice cream is preferably packaged in suitable containers via filler 128.

Cheesecake ice cream products were successfully produced by the formula presented in Example 1 via the preferred process illustrated in FIG. 1. In the following example, the ingredients are listed as an approximate percentage of total weight.

EXAMPLE 1—STICK NOVELTY

| Ingredient | % by weight |
| --- | --- |
| cream cheese | 13.0% |
| cream | 24.5% |
| milk | 19.4% |
| condensed skim milk | 10.3% |
| liquid cane sugar | 32.2% |
| stabilizing system | 0.5% |
| pure vanilla extract | 0.1% |
| total | 100.0% |

Alternatively, cane sugar (21.5%) and water (10.7%) may be substituted for the liquid cane sugar, as will be appreciated by those skilled in the art.

The cheesecake ice cream of the present invention is smooth, rich and creamy, having the texture of non-frozen cheesecake dessert. Additionally, the cheesecake ice cream of the present invention tastes like a cold slice of cheesecake dessert. Accordingly, the present invention has successfully combined two very popular desserts in the form of cheesecake ice cream.

Furthermore, the cheesecake ice cream of the present invention has enhanced cheesecake flavor, owing in part to the unique process of culturing the fluid dairy ingredients and reducing the amount of lactic acid produced as a natural by-product of the culturing process. Moreover, the cheesecake ice cream of the present invention is an all natural product with nothing artificial added therein.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A method of manufacturing a frozen cheesecake ice cream, said method comprising the steps of:

combining cream, milk and condensed skim milk to form a first mixture;

pasteurizing the first mixture;

culturing the pasteurized first mixture;

reducing the amount of lactic acid in the cultured mixture, the lactic acid having been produced as a by-product during the step of culturing;

combining cream cheese, a sweetening agent and a stabilizing component to the cultured mixture to form a second mixture;

pasteurizing and homogenizing the second mixture; and cooling the pasteurized and homogenized second mixture to produce a frozen cheesecake ice cream product.

2. The method of claim 1, wherein the step of reducing the amount of lactic acid in the cultured mixture comprises the step of adding a base component to the cultured mixture.

3. The method of claim 2, wherein the base component comprises sodium bicarbonate.

4. The method of claim 1, wherein the stabilizing component comprises carob bean gum.

5. The method of claim 4, wherein the stabilizing component further comprises monoglycerides, diglycerides and guar gum.

6. The method of claim 1, wherein the sweetening agent comprises cane sugar.

7. The method of claim 1, wherein:

the cream comprises about 24.5% of the second mixture by weight;

the milk comprises about 19.4% of the second mixture by weight;

the condensed skim milk comprises about 10.3% of the second mixture by weight;

the cream cheese comprises about 13% of the second mixture by weight; and the sweetening agent comprises liquid cane sugar and comprises about 32.2% of the second mixture by weight.

8. The method of claim 1, said method further comprising the step of combining a flavoring agent with the second mixture.

9. The method of claim 8, wherein said flavoring agent comprises about 0.1% of the second mixture by weight.

10. The method of claim 1, wherein the step of culturing the pasteurized first mixture comprises the steps of:

cooling the pasteurized first mixture to a preselected temperature; and combining a culture media to the pasteurized first mixture.

11. A method of manufacturing a frozen cheesecake ice cream, said method comprising the steps of:

combining cream, milk and condensed skim milk to form a first mixture;

pasteurizing the first mixture;

culturing the pasteurized first mixture for a preselected time period;

halting the culturing of the pasteurized first mixture after the preselected time period by combining a base component to the cultured first mixture to reduce the amount of lactic acid in the cultured first mixture, the lactic acid having been produced as a by-product during the step of culturing;

combining cream cheese, a sweetening agent and a stabilizing component to the cultured mixture, after the step of halting to form a second mixture;

pasteurizing and homogenizing the second mixture; and cooling the pasteurized and homogenized second mixture to produce a frozen cheesecake ice cream product.

12. The method of claim 11, wherein the base component comprises sodium bicarbonate.

13. The method of claim 11, wherein the step of halting the culturing of the first mixture further comprises the step of:

combining a sugar to the cultured first mixture to stop additional culturing bacteria from growing.

14. The method of claim 11, wherein:

the cream comprises about 24.5% of the second mixture by weight;

the milk comprises about 19.4% of the second mixture by weight;

the condensed skim milk comprises about 10.3% of the second mixture by weight; and the cream cheese comprises about 13% of the second mixture by weight; and the sweetening agent comprises liquid cane sugar and comprises about 32.2% of the second mixture by weight.

15. The method of claim 11, wherein the stabilizing component comprises carob bean gum.

16. The method of claim 15, wherein the stabilizing component further comprises monoglycerides, diglycerides and guar gum.

17. The method of claim 11, wherein the step of culturing the pasteurized first mixture comprises the steps of:

cooling the pasteurized first mixture to a preselected temperature; and combining a culture media to the pasteurized first mixture.

* * * * *